(12) United States Patent  
Watariuchi

(10) Patent No.: US 8,947,704 B2
(45) Date of Patent: Feb. 3, 2015

(54) INFORMATION PROCESSING APPARATUS, INFORMATION PROCESSING METHOD, AND COMPUTER-READABLE RECORDING MEDIUM TO SELECTIVELY ACQUIRE AND TRANSMIT REGISTERED INFORMATION

(75) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/528,671

(22) Filed: Jun. 20, 2012

(65) Prior Publication Data
US 2013/0003120 A1  Jan. 3, 2013

(30) Foreign Application Priority Data

Jun. 28, 2011 (JP) ................................ 2011-142993

(51) Int. Cl.
*G06F 3/12* (2006.01)
*G06K 15/02* (2006.01)

(52) U.S. Cl.
CPC .......... *G06F 3/1204* (2013.01); *G06K 15/1806* (2013.01); *G06K 15/181* (2013.01); *G06F 3/1253* (2013.01); *G06F 3/126* (2013.01); *G06F 3/1288* (2013.01); *G06F 3/1292* (2013.01)

USPC ........................... 358/1.15; 358/1.13; 358/1.1

(58) Field of Classification Search
None
See application file for complete search history.

(56) References Cited

U.S. PATENT DOCUMENTS

| 7,441,003 | B1 * | 10/2008 | Takeda et al. ................. 709/206 |
| 8,665,477 | B2 * | 3/2014 | Tanaka ......................... 358/1.15 |
| 2003/0154373 | A1 * | 8/2003 | Shimada et al. .............. 713/168 |
| 2006/0082802 | A1 * | 4/2006 | Furuya ......................... 358/1.13 |
| 2011/0096354 | A1 * | 4/2011 | Liu ............................... 358/1.15 |
| 2011/0176162 | A1 * | 7/2011 | Kamath et al. ............... 358/1.15 |
| 2012/0250076 | A1 * | 10/2012 | Kumar et al. ................ 358/1.15 |

FOREIGN PATENT DOCUMENTS

| JP | 06-077994 A | 3/1994 |
| JP | 2005115559 A * | 4/2005 |

* cited by examiner

*Primary Examiner* — Paul F Payer
(74) *Attorney, Agent, or Firm* — Canon U.S.A., Inc. IP Division

(57) ABSTRACT

By selecting information about print option processing to be performed on an image based on a user's instruction, the print option can be specified without a necessity of any complicated procedure, so that convenience of a user of a printing apparatus can be improved.

11 Claims, 17 Drawing Sheets

```
1501 ─ From:nagasaki@xxxxx.co.jp
       To: SYSTEM FIRST SECTION PRINTER <qeuvne3890cal@print.xxxxx.com>
1502 ─ Cc: COLOR PRINT <color@print.xxxxx.com>, A4 SHEET <A4@print.xxxxx.com>,
       2 in 1 <2up@print.xxxxx.com>
       Subject: xx SYSTEM REFERENCE MATERIAL
       Content-Type: multipart/mixed; boundary="xxxxxxxxxxxxxxxxxx"

REFERENCE MATERIAL FOR xx SYSTEM.
       PLEASE CIRCULATE THIS.

1503 ─ REFERENCE MATERIAL.PDF
```

FIG.11

1100 OPTION MAIL ADDRESS MANAGEMENT TABLE

| OPTION ID 1101 | OPTION MAIL ADDRESS 1102 | OPTION NAME 1103 | PROCESSING LOCATION 1104 | GROUP 1105 | CONFLICT LIST 1106 | PRINTING CAPACITY 1107 |
|---|---|---|---|---|---|---|
| opt0001 | color@print.xxxxx.com | COLOR PRINT | IMAGE FORMING APPARATUS | A | opt0023,.... | Color::cl |
| opt0002 | black_and_white@print.xxxxx.com | MONOCHROMATIC PRINT | IMAGE FORMING APPARATUS | A | opt0012,opt0013,.... | Color::bw |
| opt0003 | A4@print.xxxxx.com | A4 PAPER | IMAGE FORMING APPARATUS | B | opt0031,.... | Paper::A4 |
| opt0004 | A3@print.xxxxx.com | A3 PAPER | IMAGE FORMING APPARATUS | B | opt0049,.... | Paper::A3 |
| opt0005 | z-fold@print.xxxxx.com | Z FOLD | IMAGE FORMING APPARATUS | C | opt0032,.... | Fold::z |
| opt0006 | staple_lt@print.xxxxx.com | STAPLING ON TOP LEFT | IMAGE FORMING APPARATUS | D | opt0016,.... | Staple::lt |
| opt0007 | sharpness_high@print.xxxxx.com | STRONG SHARPNESS | SERVER | E | opt0014,.... | — |
| opt0008 | sharpness_low@print.xxxxx.com | WEAK SHARPNESS | SERVER | E | opt0014,.... | — |
| opt0009 | nega_posi@print.xxxxx.com | NEGATIVE/POSITIVE INVERSION | SERVER | F | opt0012,opt0013,.... | — |
| opt0010 | 2up@print.xxxxx.com | 2 in 1 | SERVER | G | opt0041,.... | — |
| opt0011 | 4up@print.xxxxx.com | 4 in 1 | SERVER | G | opt0042,.... | — |
| opt0012 | vivid_colors@print.xxxxx.com | MAKING VIVID | SERVER | H | opt0002,opt0009,.... | — |
| opt0013 | sepia_tone@print.xxxxx.com | IN SEPIA | SERVER | H | opt0002,opt0009,.... | — |
| opt0014 | soft_focus@print.xxxxx.com | SOFT FOCUS | SERVER | I | opt0007,opt0008,.... | — |
| .... | .... | .... | .... | .... | .... | .... |

FIG.12

1200 APPARATUS MAIL ADDRESS MANAGEMENT TABLE

| APPARATUS MAIL ADDRESS | IMAGE FORMING APPARATUS ID | AVAILABLE LIST | ADMINISTRATOR MAIL ADDRESS |
|---|---|---|---|
| jgrjiwaep38hv@print.xxxxx.com | 89456321 | opt001, opt002, opt003, opt004 | yamaguchi@xxxxx.co.jp |
| qeuvne3890cal@print.xxxxx.com | 54786215 | opt002, opt003, opt004, opt005, opt006 | yamaguchi@xxxxx.co.jp |
| kn83ia83ad11a@print.xxxxx.com | 47821548 | opt001, opt002, opt003, opt004, opt005 | fukuoka@xxxxx.co.jp |
| kfo08jy6ub678i@print.xxxxx.com | 36985469 | opt002, opt003 | fukuoka@xxxxx.co.jp |
| nbh6ghjty781@print.xxxxx.com | 41258554 | opt002, opt003, opt004, opt006 | fukuoka@xxxxx.co.jp |

1201  1202  1203  1204

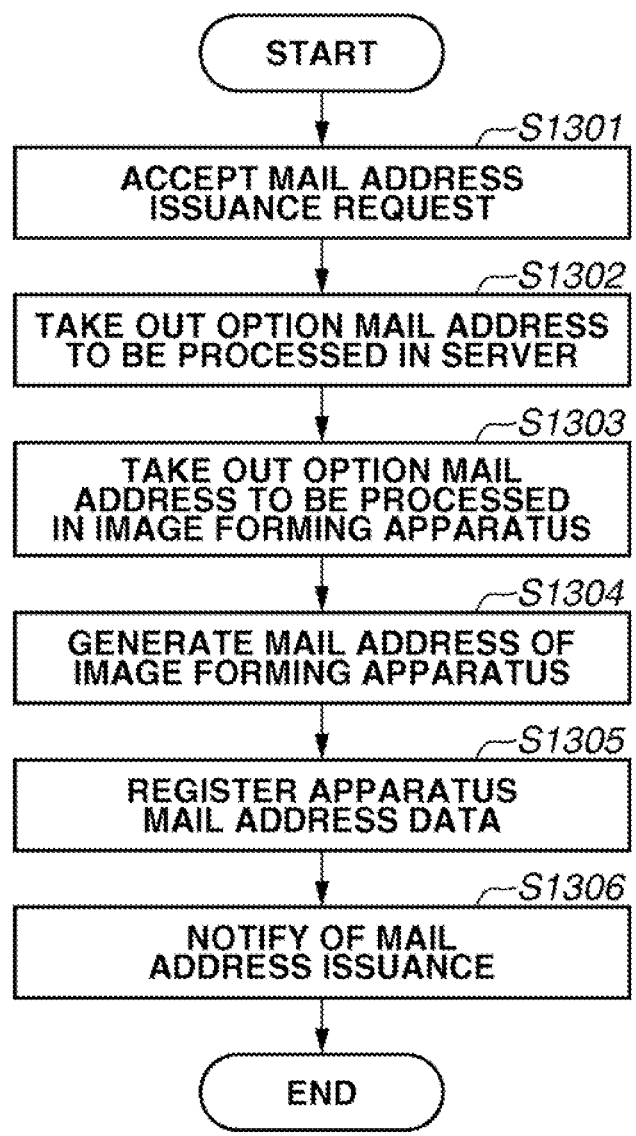

FIG.15

From:nagasaki@xxxxx.co.jp
To: SYSTEM FIRST SECTION PRINTER <qeuvne3890cal@print.xxxx.com>
Cc: COLOR PRINT <color@print.xxxx.com>, A4 SHEET <A4@print.xxxx.com>, 2 in 1 <2up@print.xxxx.com>
Subject: xx SYSTEM REFERENCE MATERIAL
Content-Type: multipart/mixed; boundary="xxxxxxxxxxxxxxxxxxx"

REFERENCE MATERIAL FOR xx SYSTEM.
PLEASE CIRCULATE THIS.

REFERENCE MATERIAL.PDF 1501
1502
1503

INFORMATION PROCESSING APPARATUS, INFORMATION PROCESSING METHOD, AND COMPUTER-READABLE RECORDING MEDIUM TO SELECTIVELY ACQUIRE AND TRANSMIT REGISTERED INFORMATION

BACKGROUND OF THE INVENTION

1. Field of the Invention

The present application relates to an information processing apparatus, an information processing method, and a computer-readable recording medium.

2. Description of the Related Art

As a print instruction method to an image forming apparatus corresponding to a network, conventionally, a method of transmitting image data to a print service provided by the image forming apparatus using a specified protocol has been adopted. However, this method contains such an issue that any client which does not support the specified protocol cannot issue a print instruction.

As a resolution for the issue, a technique for issuing a print instruction using electronic mail has been discussed. A client (information processing apparatus) transmits an electronic mail, to which image data that a user wants to print is attached, to an electronic mail address (mail address) allocated to each image forming apparatus. After receiving the electronic mail, a mail server processes the image data attached to the electronic mail to print data, and issues a print instruction to an image forming apparatus specified as a destination of the electronic mail. After receiving the print instruction, the image forming apparatus receives and prints the print data.

Japanese Laid-Open Patent Application No. 06-077994 discusses a technique in which a print option is specified by describing a parameter relating to print such as two-sided print, color print, or the like (hereinafter referred to as a "print option") in a parameter file and attaching the parameter to an electronic mail.

However, according to the method discussed in Japanese Laid-Open Patent Application No. 06-077994, it is necessary to create a parameter file at a mobile terminal to specify a print option thereby requiring time and labor, which is an issue. Additionally, a user needs to know how to describe the parameter file, and there is no easy means for specifying the print option through an electronic mail.

SUMMARY OF THE INVENTION

According to an aspect of the present invention, an information processing apparatus includes a registration unit configured to register information corresponding to a printing apparatus which prints an image and information corresponding to option processing to be performed on the image in a storage unit, an acquisition unit configured to selectively acquire each information registered by the registration unit from the storage unit based on a user instruction, and a transmission unit configured to transmit the image to be printed by the printing apparatus together with the information corresponding to the option processing acquired by the acquisition unit using an electronic mail based on the information corresponding to the printing apparatus acquired by the acquisition unit.

According to another aspect of the present invention, by selecting information for the print option, a user can specify the print option without a necessity of any complicated procedure, so that the convenience of the user can be improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates an example of a mail address management table in the server according to the first exemplary embodiment.

FIG. 12 illustrates an example of another mail address management table in the server according to the first exemplary embodiment.

FIG. 13 is a flow chart illustrating an example of processing in the server according to the first exemplary embodiment.

FIG. 15 illustrates an example of a mail to be transmitted from a mobile terminal according to the first exemplary embodiment.

DESCRIPTION OF THE EMBODIMENTS

Various exemplary embodiments, features, and aspects of the invention will be described in detail below with reference to the drawings.

Figure 1:
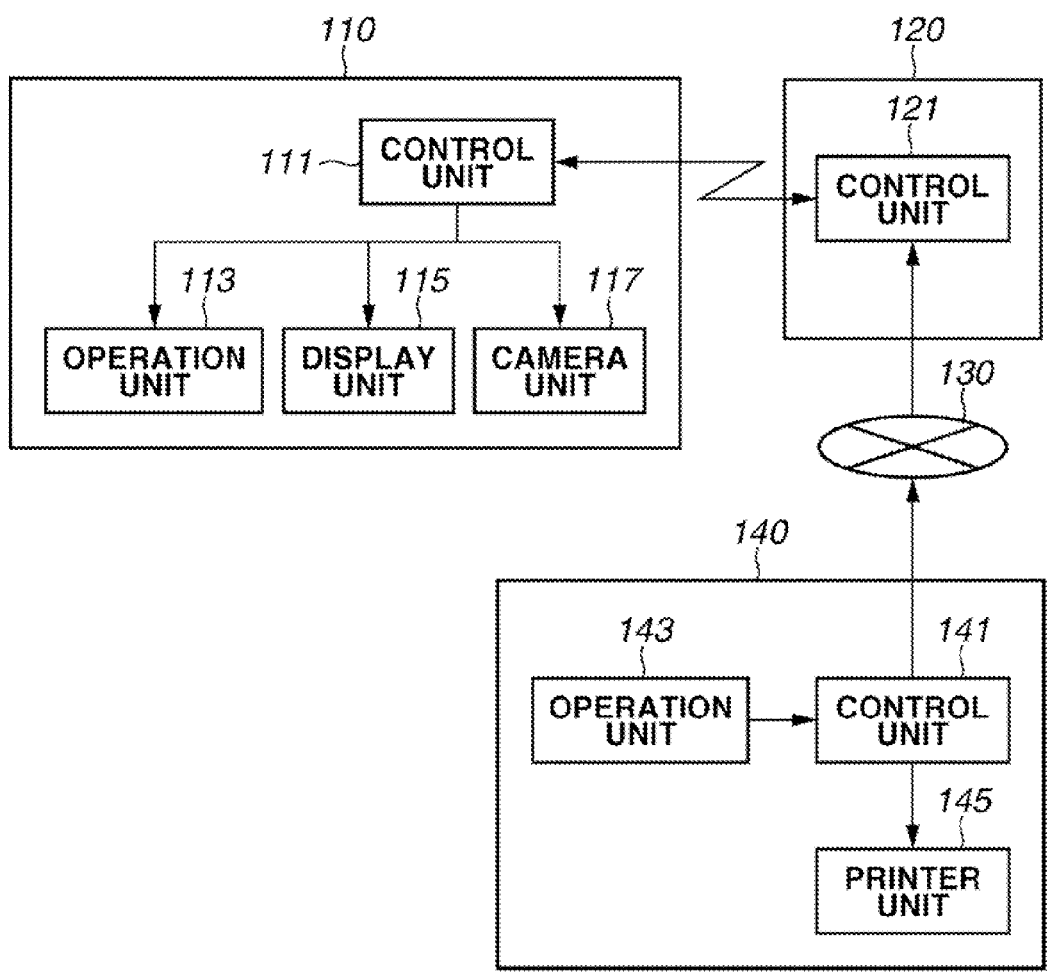
FIG. 1 is a block diagram illustrating an example configuration of a printing system according to a first exemplary embodiment.

FIG. 1 is a block diagram illustrating an example of a configuration of a print system according to a first exemplary embodiment.

In this system, a mobile terminal 110 communicates with a server 120 through an electronic mail (hereinafter referred to as "mail"). The server 120 is connected to an image forming apparatus 140 via a network such as wide-area network (WAN) 130 to communicate with an image forming apparatus 140.

Communication between the mobile terminal 110 and the server 120 may be carried out directly via a local area network (LAN) or may be carried out via one or more servers, for example, a server in a base station of the mobile terminal. Connection between the server 120 and the image forming apparatus 140 is not limited to via the WAN 130 but may be carried out via the LAN.

The mobile terminal (hereinafter referred to as "mobile") includes a control unit 111, an operation unit 113, a display unit 115, and a camera unit 117, and the control unit 111 is connected to the operation unit 113, the display unit 115, and the camera unit 117. The control unit 111 includes a central processing unit (CPU), a read-only memory (ROM), a random access memory (RAM), and a flash memory. The ROM stores a control program for the control unit 111 to control the operation unit 113 and the display unit 115, and a program for the mobile 110 to execute transmission and reception of a mail with the server 120. In some embodiments, the control program and the program refer to a computer program and an apparatus provided with a CPU is referred to as a computer.

The CPU controls the operations of the operation unit 113, the display unit 115, and the camera unit 117 by reading out the control program stored in the ROM to the RAM, and analyzing and executing the read program. The CPU executes transmission and reception of a mail by reading out a mail transmission/reception program stored in the flash memory to the RAM, and analyzing and executing the read program. For transmission of a mail, the control unit 111 attaches an electronic file (hereinafter referred to as a "file") stored in the flash memory to a mail and then, transmits the mail. For reception of a mail, the control unit 111 controls the display unit 115 to display a content of the mail received by the server 120 thereon.

The control unit 111 controls the camera unit 117 to execute image capturing and reading of a quick response (QR) code (two-dimensional bar code). The flash memory stores a program for executing processing illustrated in the flowcharts in FIGS. 8 and 9, and the CPU reads out the program to the RAM, and analyzes and executes the read program for the mobile 110 to execute various types of information processing. In other words, the mobile 110 is an information processing apparatus.

The server 120 includes a control unit 121 for controlling an entire operation of the server 120.

The image forming apparatus 140 includes the control unit 121 for controlling the entire operation of the image forming apparatus 140, an operation unit 143 which serves as a user interface (UI), and a printer unit 145 which serves as an image output device.

Figure 2:
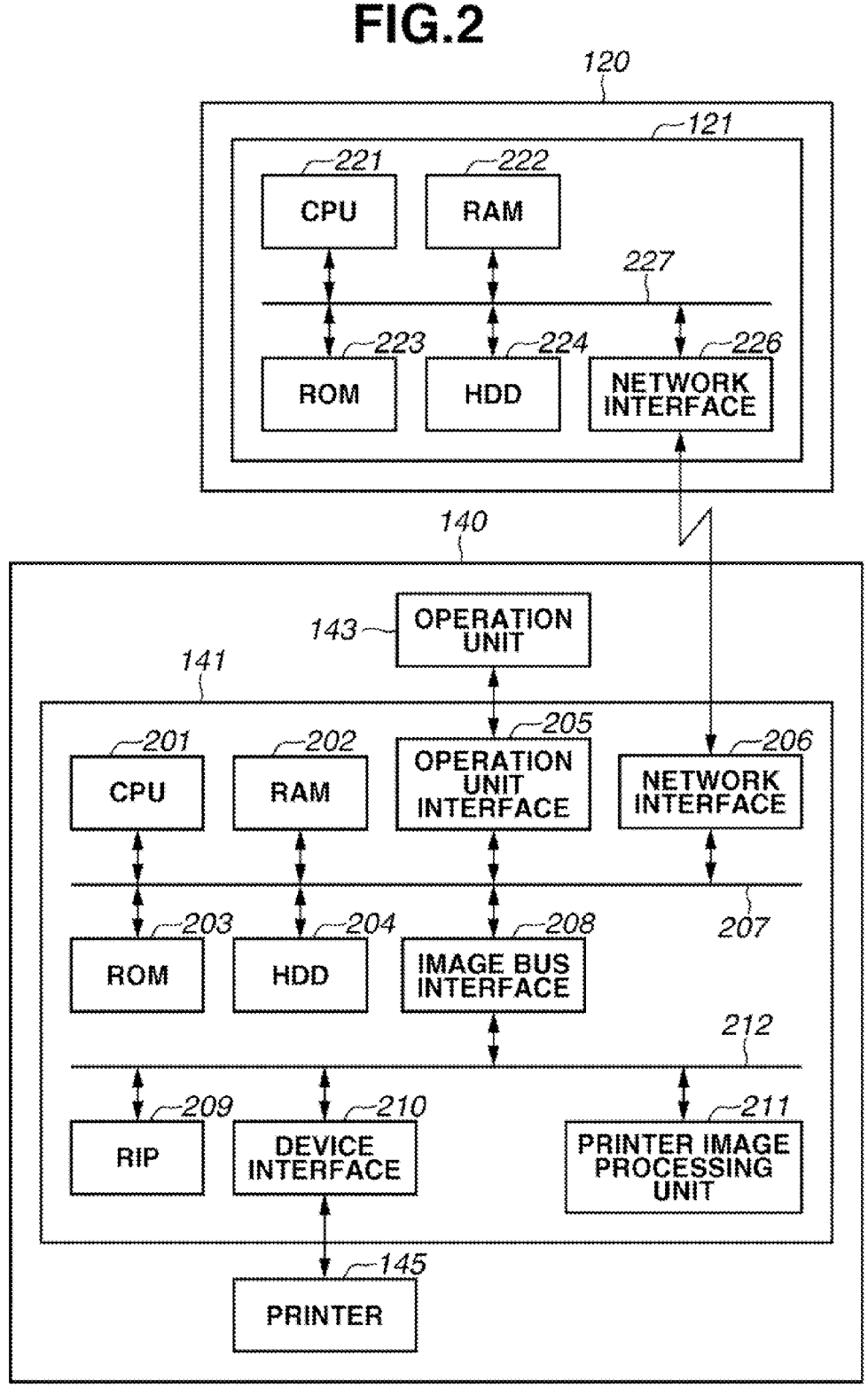
FIG. 2 is a block diagram illustrating an example hardware configuration of a server and an image forming apparatus according to the first exemplary embodiment.

Next, the hardware configurations of the control units 121, 141 in the server 120 and the image forming apparatus 140 respectively will be described with reference to FIG. 2. FIG. 2 is a block diagram illustrating the control unit 121 of the server 120 and the control unit 141 of the image forming apparatus 140.

The control unit 121 includes a CPU 221, a RAM 222, a ROM 223, a hard disk drive (HDD) 224, and a network interface (I/F) 226, connected via a system bus 227. The network I/F 226 is also connected to a network I/F of the image forming apparatus 140 via the WAN 130 to execute transmission/reception of a file.

The ROM 223 stores a control program for controlling an operation of the server 120, and the control unit 121 controls the entire operation of the server 120 by causing the CPU 221 to read out the control program to the RAM 222 and analyze and execute the read program. The HDD 224 stores a mail transmission/reception program for transmission and reception of a mail to/from the mobile 110. The CPU 221 reads out the mail transmission/reception program to the RAM 222 and analyzes and executes the read program, so that transmission/reception of a mail between the mobile 110 and the server 120 is executed.

The HDD 224 further stores a program for transmitting and receiving a file with the image forming apparatus 140 and a program for implementing image processing on the received file. The CPU 221 reads out the file transmission/reception program to the RAM 222, and analyzes and executes the read program; thus the server 120 can execute transmission and reception of the file with the image forming apparatus 140. Further, the CPU 221 reads out the image processing program to the RAM 222, and analyzes and executes the read program; thus the server 120 can execute the image processing on the file.

Figure 14:
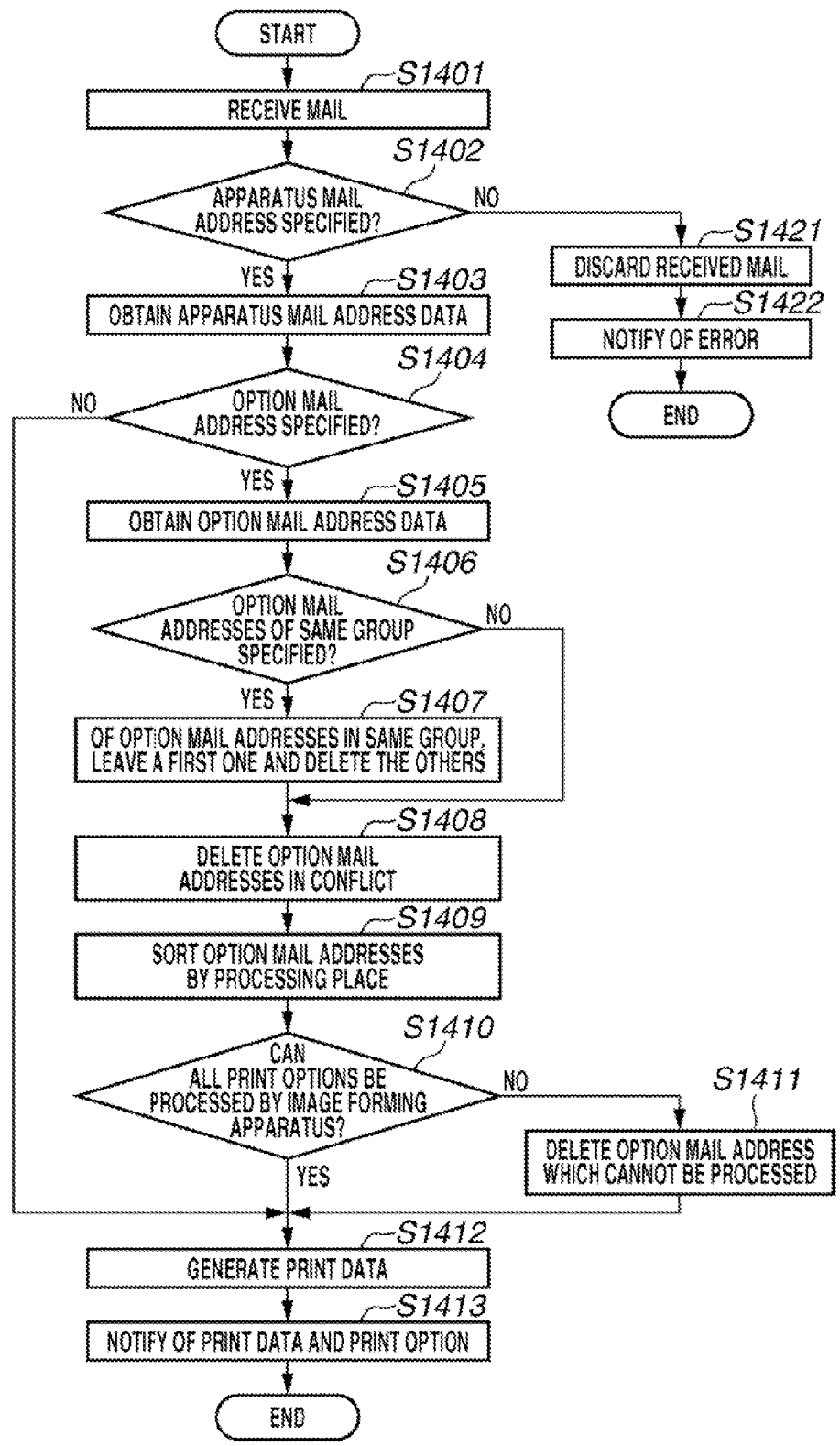
FIG. 14 is a flow chart illustrating an example of the processing in the server according to the first exemplary embodiment.

The HDD 224 stores a program for implementing processing illustrated in the flow charts in FIGS. 11 and 14, and the server 120 executes various types of processing by causing the CPU 221 to read out the image processing program to the RAM 222, and analyzes and executes the read program.

The control unit 141 is electrically connected to the printer unit 145 while the control unit 141 is also connected to the server 120 and an external apparatus via the WAN 130. Accordingly, an image data file and device information can be input and output.

The CPU 201 integrally controls an access to various types of connected devices based on the control program and the like stored in the ROM 203, and integrally controls various types of processing to be carried out inside the control unit 141. The RAM 202 is a system work memory for enabling the CPU 201 to operate and also a memory which temporarily stores image data. The RAM 202 can include a static random access memory (SRAM) for storing the stored content after the power is turned off and a dynamic random access memory (DRAM) in which the stored content is deleted after the power is turned off.

The ROM 203 stores a boot program for the image forming apparatus and the like. The HDD 204 can store system software and image data. The HDD 204 stores a program for executing processing illustrated in the flow charts in FIGS. 5 and 6, and the image forming apparatus 140 executes various types of processing by causing the CPU 201 to read out the program to the RAM 202, and analyze and execute the read program.

The operation unit I/F 205 is an interface unit which connects the operation unit 143 to the system bus 207. The operation unit I/F 205 receives image data to be displayed on the operation unit 143 from the system bus 207 and outputs the image data to the operation unit 143. Further, the operation unit I/F 205 outputs information input from the operation unit 142 to the system bus 207.

The network I/F 206 is connected to the WAN 30 and the system bus 207 for input and output of information. The network I/F 206 is connected to the network I/F of the server 120 via the WAN 130 for transmission and reception of a file.

Interface image bus I/F 208 connects the system bus 207 with an image bus 212, which transfers image data at high speed and operates as a bus bridge for converting a data configuration.

The image bus 212 is a transmission path for transmitting and receiving image data and can comprise a peripheral component interconnect (PCI) bus or an Institute of Electrical and Electronic Engineers (IEEE) 1394 bus. A raster image processor (RIP) 209, a device I/F 210, and a printer image processing unit 211 are connected to the image bus 212.

The RIP 209 generates raster data based on display list (DL) generated by converting page description language (PDL) data received from the network I/F 206 by the CPU 201.

The device I/F 210 is an interface which connects the printer unit 145 with the control unit 141, executes synchronous/asynchronous conversion of the image data, and temporarily stores input/output data in a buffer memory (not illustrated).

The printer image processing unit 211 performs color conversion, filter processing, resolution conversion, and the like on the image data output to the printer unit 145.

Figure 3:
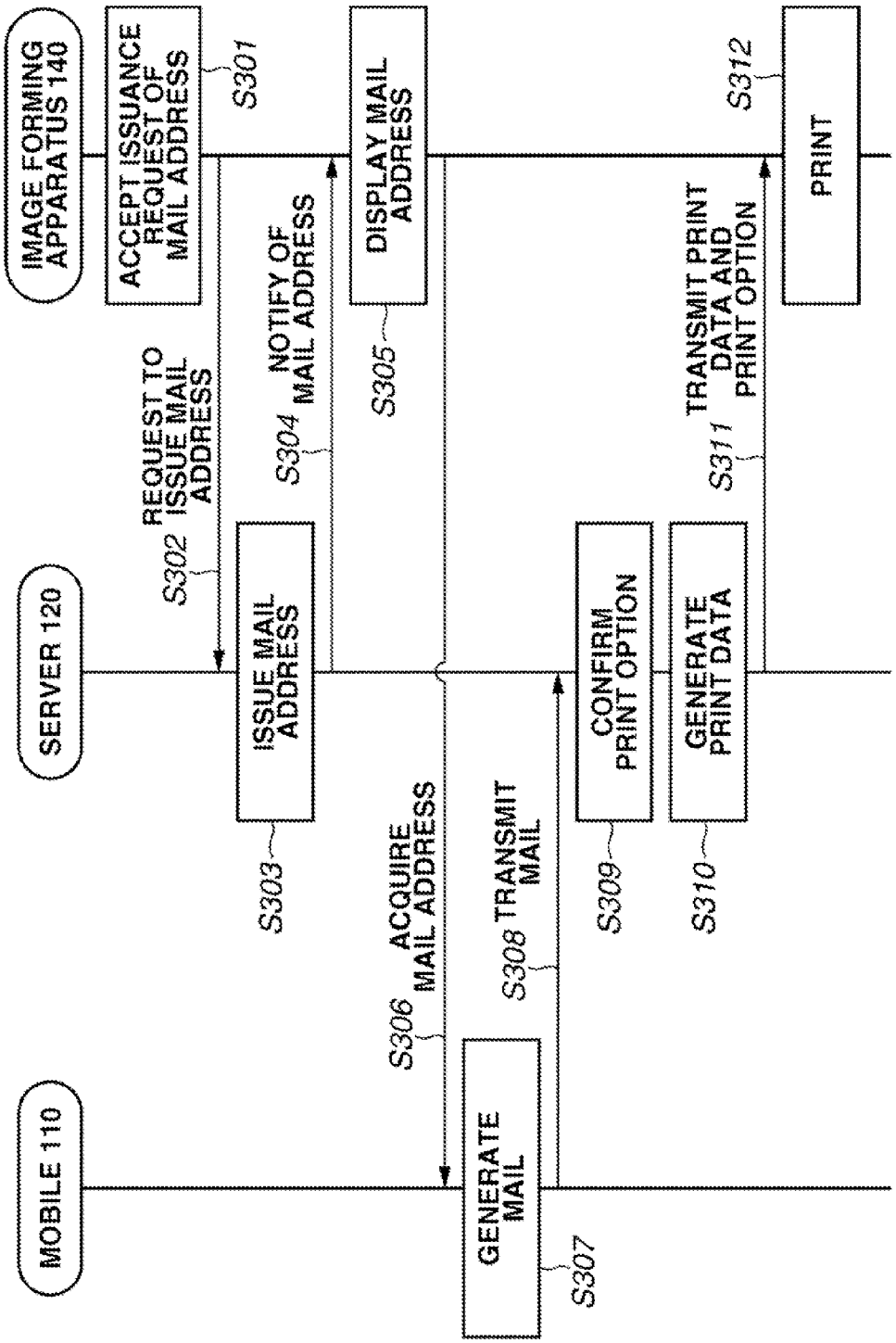
FIG. 3 is a sequence diagram illustrating an example of processing in the print system according to the first exemplary embodiment.

With reference to FIG. 3, processing executed by the print system according to an exemplary embodiment will be described. FIG. 3 is a sequence diagram illustrating example processing of the print system.

In step S301, the image forming apparatus 140 receives an issuance request of an electronic mail address to be allocated to the apparatus itself from a user. In step S302, when the image forming apparatus 140 receives the request from the user, the image forming apparatus 140 requests the server 120 to issue a mail address. Then, the image forming apparatus 140 notifies the server 120 of its own printing capacity. The printing capacity refers to a function of the image forming apparatus to process at the time of printing, such as two-sided printing, staple printing, and saddle stitch printing.

In step S303, upon receiving the request from the image forming apparatus 140, the server 120 newly issues a mail address allocated to the requesting image forming apparatus 140, and in step S304, notifies the image forming apparatus 140 thereof.

Then, notification is provided of a mail address corresponding to a print option which can be processed by the image forming apparatus 140, in addition to the mail address allocated to the image forming apparatus 140. A print option which can be processed by the server 120 is also notified at the same time. Hereinafter, an electronic mail address allocated to the image forming apparatus 140 is designated as "apparatus mail address" and an electronic mail address allocated to the print option is designated as "option mail address". When mentioning just "mail address", it is assumed that the mail address generally designates both the apparatus mail address and the option mail address.

In step S305, after receiving the notification from the server 120, the image forming apparatus 140 displays the mail address notified from the server 120 on the operation unit 143 in the form of a QR code.

In step S306, the mobile 110 captures an image of the QR code displayed on the operation unit 143 of the image forming apparatus 140, reads the mail address from the QR code, and registers the mail address into an address book of the mobile 110 itself. The QR code is stored in the HDD 204 so that the QR code can be displayed on the operation unit 143 by a user's operation without the issuance request for the mail address in step S301.

Next, in step S307, to instruct a print, the mobile 110 sets image data for print as an attached file, creates an electronic mail with the apparatus mail address allocated to the image forming apparatus set as a destination, and in step S308, transmits the mail. If a user wants to specify a print option, in step S307, the user sets its option mail address as a destination. The mail addresses to be set in step S307 are preliminarily registered in the address book of the mobile 110, and the user can select a mail address, from the address book via the operation unit 113, to set the mail address as a destination.

FIG. 15 illustrates an example of an electronic mail to be transmitted by the mobile 110. In the electronic mail illustrated in FIG. 15, an apparatus mail address 1501 is set in a "To" field as a destination, an option mail address 1502 is set in a "Cc" field, and image data (attached image) is set as an attached file 1503. Although, in this example, the option mail address is specified in the "Cc" field, the option mail address may alternatively or additionally be specified in the "To" field. In addition, a plurality of the option mail addresses may be specified as destinations.

In step S309, after receiving the electronic mail transmitted in step S308, the server 120 confirms the print option based on the option mail address set in the destination of the electronic mail. More specifically, the server 120 checks whether any conflict occurs among the print options corresponding to the plurality of the specified option mail addresses (e.g., a conflict between 2-in-1 printing and 4-in-1 printing). Additionally, the server 120 identifies the print option to be processed by the server 120 from the print option to be processed by the image forming apparatus 140.

In step S310, the server 120 generates print data for printing a body text of the received mail and image data attached to the received mail. When generating the print data, the server 120 generates the print data using the print option determined to be processed by the server 120 (e.g., 2-in-1 printing, monochromatic print).

Next, in step S311, the server 120 transmits the generated print data and the print option to be processed by the image forming apparatus 140 (e.g., staple printing, Z-fold printing) to the image forming apparatus 140 designated by the apparatus mail address.

In step S312, after receiving the print data and the print option, the image forming apparatus 140 prints the print data with the printer unit 145 according to the print option.

Next, processing executed by the image forming apparatus according to an exemplary embodiment will be described in detail with reference to FIGS. 4 to 6. The CPU 201 reads out a program for executing the processing illustrated in the flow charts in FIGS. 5 and 6 from the HDD 204 to the RAM 202, and analyzes and executes the read program, so that each processing in the image forming apparatus 140 is achieved. Thus, the control unit 141 can function as each processing unit illustrated in FIG. 4.

Figure 4:
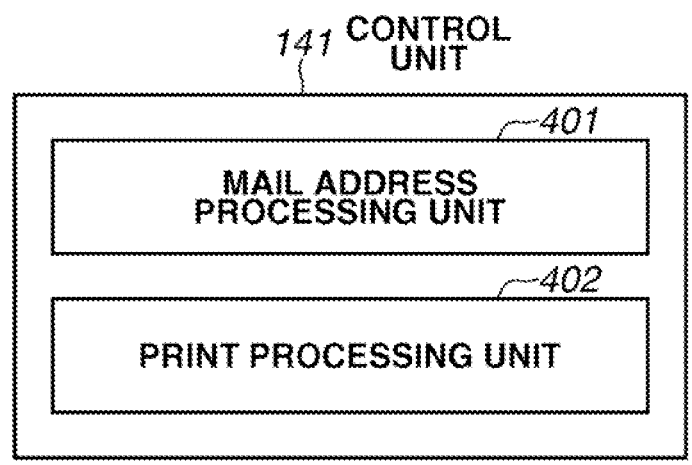
FIG. 4 is a block diagram illustrating an example software configuration in the image forming apparatus according to the first exemplary embodiment.

FIG. 4 illustrates a software configuration of the image forming apparatus 140 according to an exemplary embodiment.

A mail address processing unit 401 executes processing for accepting an issuance of an apparatus mail address and displaying the mail address. A print processing unit 402 controls the printer unit 145 to execute printing of the image data.

Figure 5:
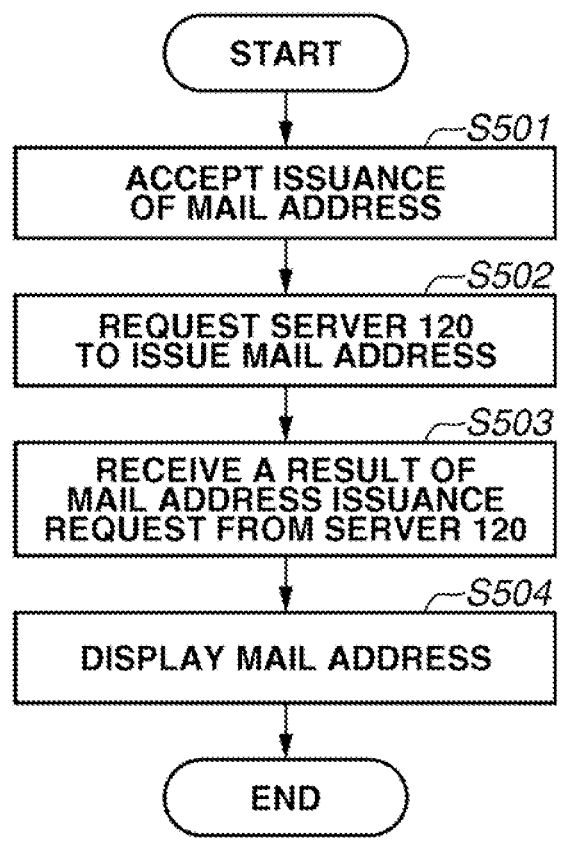
FIG. 5 is a flow chart illustrating an example of processing in the image forming apparatus according to the first exemplary embodiment.

FIG. 5 is a flow chart for executing the processing shown in steps S301 to S305 of FIG. 3, by the image forming apparatus 140 of an exemplary embodiment.

In step S501, the mail address processing unit 401 accepts a request for issuance of the apparatus mail address to be allocated to the image forming apparatus 140, via the operation unit 143 from a user.

In step S502, after receiving the request from the user, the mail address processing unit 401 requests the server 120 to issue the mail address. The mail address processing unit 401 then notifies the server 120 of an identification (ID) for uniquely identifying the image forming apparatus, a mail address of an administrator of the image forming apparatus 140, and the print capacity of the image forming apparatus 140.

In step S503, as a result of the request for issuance of the mail address, the mail address processing unit 401 receives a single apparatus mail address and a plurality of option mail addresses from the server 120. Finally, in step S504, the mail address processing unit 401 displays the received mail address on the operation unit 143 as the QR code and ends the processing. Thus, the mail address processing unit 401 can function as a mail address display unit.

Figure 6:
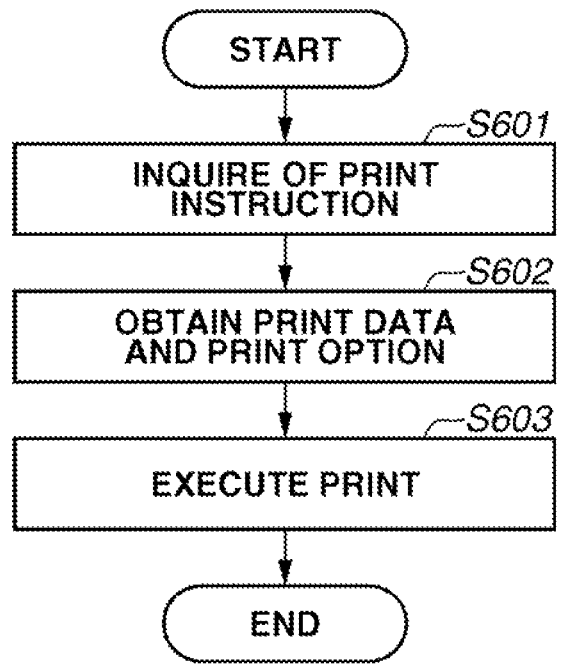
FIG. 6 is a flow chart illustrating an example of the processing in the image forming apparatus according to the first exemplary embodiment.

FIG. 6 is a flow chart for executing the processing shown in steps S311 and S312 of FIG. 3, by the image forming apparatus 140 of an exemplary embodiment. In step S601, the print processing unit 402 inquires the server 120 about a print instruction to confirm the print instruction of the server 120 at a predetermined time interval. In step S602, if any print instruction is provided, the print processing unit 402 obtains the print data and the print option from the server 120. Thus, the print processing unit 402 can function as a print information receiving unit for receiving the print data and the print option from the server 120.

In step S603, the print processing unit 402 prints the received print data with the printer unit 145 according to the print option, and ends the processing. Thus, the print processing unit 402 can function as a printing unit.

Although in at least one exemplary embodiment a method in which the print processing unit 402 checks the print instruction from the server 120 at the predetermined time interval is described, it is also permissible to establish an extensible Messaging and Presence Protocol (XMPP) session between the server 120 and the image forming apparatus 140 and to notify the image forming apparatus 140 of the print instruction from the server 120. The XMPP session is an Extensible Markup Language (XML) basis protocol for achieving a push notification and is achieved by establishing a special session between the server 120 and the image forming apparatus 140.

Next, processing executed by the mobile 110 according to an exemplary embodiment will be described in detail with reference to FIGS. 7-9. The CPU in the control unit 111 reads out a program for executing the processing illustrated in the flow charts in FIGS. 8 and 9 from the flash memory to the RAM, and analyzes and executes the read program, so that each processing in the mobile 110 is achieved. Thus, the control unit 111 can function as each of the processing units illustrated in FIG. 7.

Figure 7:
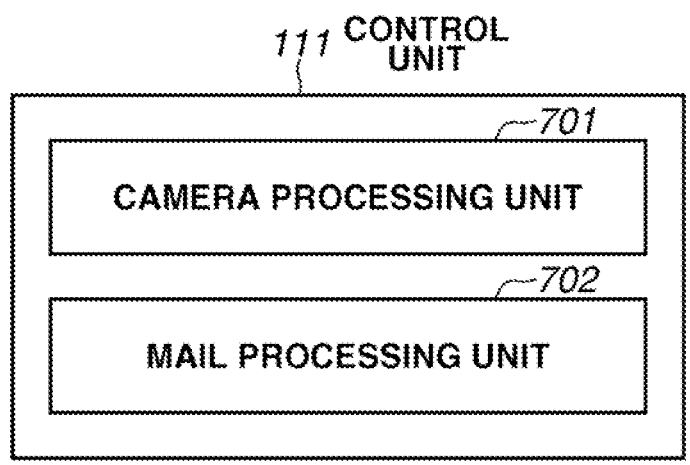
FIG. 7 is a block diagram illustrating an example software configuration in a mobile terminal according to the first exemplary embodiment.

FIG. 7 illustrates a software configuration of the mobile 110 according to an exemplary embodiment. A camera processing unit 701 executes reading of the QR code using the camera unit 117. A mail processing unit 702 executes processing of transmitting/receiving of an electronic mail.

Figure 8:
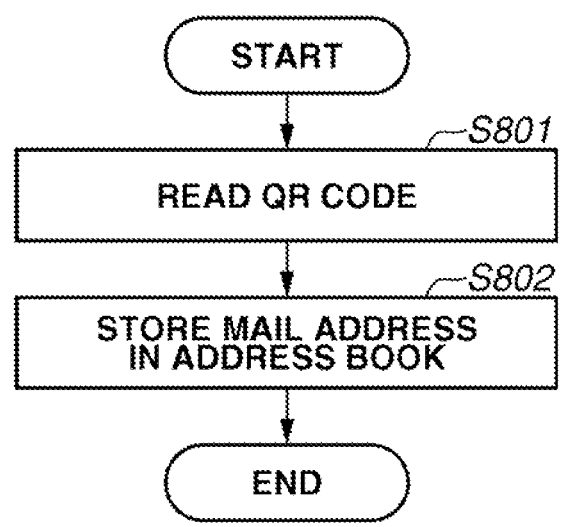
FIG. 8 is a flow chart illustrating an example of processing in the mobile terminal according to the first exemplary embodiment.

FIG. 8 is a flow chart for executing the processing in step S306 in FIG. 3 by the mobile 110 of an exemplary embodiment. In step S801, the camera processing unit 701 reads the QR code displayed in step S305 by the camera unit 117 and, in step S802, registers the read mail address in its own address book. Thus, the camera processing unit 701 can function as a registration unit for registering the mail address in a storage unit. The address book mentioned here refers to a storage unit which stores information in the form of an address book.

The address book which is a storage destination of the read mail address is just an example and may be of any type of format, as long as the stored mail address can be selectively and distinctly specified and acquired from other information pieces. In one exemplary example, the storage destination may be of any storage destination which can obtain information to be stored by a function provided for the mobile 110 as a standard (standard function). The standard function refers to a function which the mobile 110 is provided with at the time of shipment from the factory. The address book is described below as a storage destination for the mail address according to an exemplary embodiment.

Figure 9:
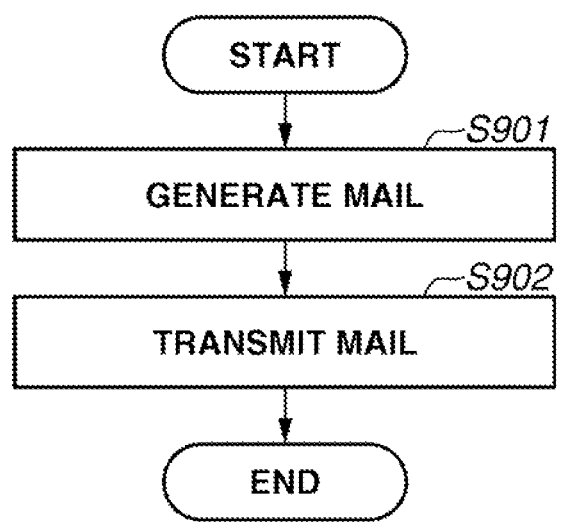
FIG. 9 is a flow chart illustrating an example of the processing in the mobile terminal according to the first exemplary embodiment.

FIG. 9 is a flow chart for executing the processing shown in steps S307 and S308 of FIG. 3 by the mobile 110 of an exemplary embodiment. In step S901, the mail processing unit 702 generates an electronic mail to instruct printing and then, in step S902, transmits the mail. Thus, the mail processing unit 702 can function as a mail transmission unit for transmitting a mail to the server 120. Based on a user instruction received via the operation unit 113, the mail processing unit 702 sets at an electronic mail destination the apparatus mail address allocated to the image forming apparatus with which the user wants to perform printing and the option mail address allocated to the print option needed for printing. In addition, the image data to be printed is set in an attached file of the electronic mail.

Through a series of the processing, the user selects the apparatus mail address and the option mail address registered in the address book via the operation unit 113. In response to the selection, the mail processing unit 702 obtains the mail addresses from the address book and sets the mail addresses as the destination(s) of the electronic mail. Thus, the mail processing unit 702 can function as an obtaining unit for obtaining information from the address book which serves as the storage unit. Then, the mail processing unit 702 transmits the mail in which the mail addresses and the image data are set.

Next, the processing in the server 120 of an exemplary embodiment will be described in detail with reference to FIGS. 10-14. A program for executing the processing illustrated in the flow charts in FIGS. 13 and 14 is read out from the HDD 224 to the RAM 222, and analyzed and executed by the CPU 221, so that each of the processing in the server 120 is achieved. Thus, the control unit 121 can function as each processing unit illustrated in FIG. 10.

Figure 10:
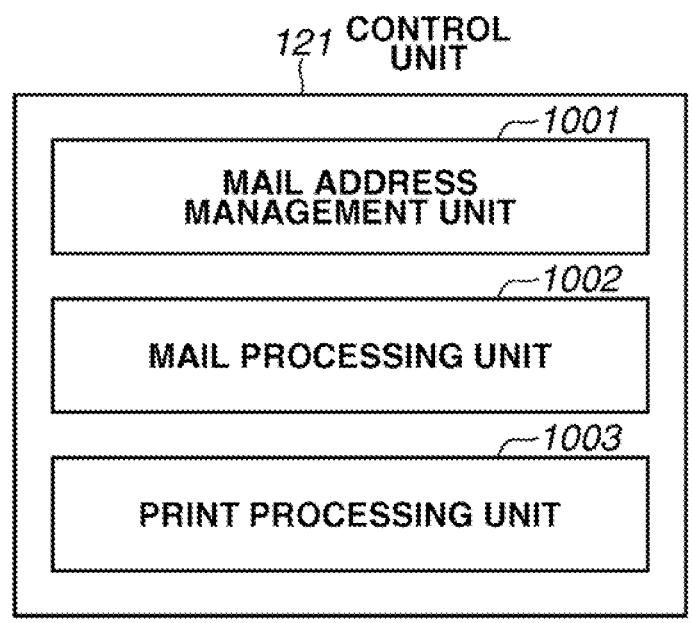
FIG. 10 is a block diagram illustrating an example software configuration of a server according to the first exemplary embodiment.

FIG. 10 illustrates a software configuration of the server 120 according to an exemplary embodiment. A mail address management unit 1001 manages the apparatus mail address and the option mail address. A mail processing unit 1002 processes for transmission and reception of the electronic mail. A print processing unit 1003 executes processing for printing a body text of the received electronic mail and attached image data.

FIG. 11 illustrates an option mail address management table 1100 which is stored in the HDD 224 for the server 120 to manage the option mail address. The option mail address management table 1100 contains each data of an option identification (ID) 1101, an option mail address 1102, an option name 1103, a processing location 1104, a group 1105, a conflict list 1106, and a print capacity 1107 of the image forming apparatus. Hereinafter, the respective data pieces are generally referred to as option mail address data.

The option ID 1101 is an ID for uniquely identifying a print option. The option mail address 1102 is a mail address allocated to the print option. The option name 1103 is a name of the print option. The processing location 1104 indicates a location in which the relevant print option is to be processed (the server or the image forming apparatus).

The group 1105 indicates a group to which the relevant print option belongs. For example, in FIG. 11, a group A indicates a color attribute for printing and a group B indicates paper to be used in printing. The conflict list 1106 indicates an option ID list of a print option conflicting with the print option of the relevant record. For example, because processing for adjusting the color tone such as the option ID opt0012 for "making vivid" and the option ID opt0013 for "in sepia" conflict with the option ID opt0002 for "monochromatic print", the conflict list 1106 of the option ID opt0002 states the option IDs opt0012 and opt0013.

The print capacity 1107 indicates a print capacity of an image forming apparatus corresponding to the relevant print option.

FIG. 12 illustrates a mail address management table 1200 stored in the HDD 224 to manage apparatus mail addresses which the server 120 allocates to each image forming apparatus. The mail address management table 1200 contains each data of an apparatus mail address 1201, an image forming apparatus ID 1201, an available list 1203, and an administrator mail address 1204. Hereinafter, the respective data pieces are generally referred to as "apparatus mail address data".

The apparatus mail address 1201 is a mail address allocated to the image forming apparatus ID 1202. The apparatus mail address 1201 is an electronic mail address having the same domain name as the above-described option mail address 1102. Because the apparatus mail address 1201 and the option mail address 1102 have the same domain name, the server 120 does not need to be configured to process electronic mails corresponding to a plurality of domain names when receiving the image data. Thus, the server only needs to be configured to process an electronic mail corresponding to a single domain name.

The available list 1203 is an option ID list of the print options which the image forming apparatus indicated by the image forming apparatus ID 1202 can process. The administrator mail address 1204 indicates a mail address of an administrator of the image forming apparatus ID 1202.

FIG. 13 is a flow chart for executing the processing shown in steps S302 to S304 of FIG. 3 using the server 120 of an exemplary embodiment. In step S1301, the mail address management unit 1001 accepts a request for issuance of the mail address from the image forming apparatus 140. The mail address management unit 1001 receives the ID of the image forming apparatus 140, the administrator mail address of the image forming apparatus 140, and the print capacity of the image forming apparatus 140.

Next, in step S1302, the mail address management unit 1001 extracts a list of the option mail addresses to be processed by the server from the option mail address management table 1100.

In step S1303, the mail address management unit 1001 extracts a list of the option mail addresses whose print capacity coincides with the print capacity received in step S1301 from the option mail address management table 1100. In other words, according to the print capacity of the image forming apparatus 140 which has transmitted the mail address issuance request, the mail address management unit 1001 determines the option mail address to be notified to the image forming apparatus 140 from a plurality of the option mail addresses.

In step S1304, the mail address management unit 1001 generates a new apparatus mail address, and in step S1305, registers the generated apparatus mail address in the apparatus mail address management table 1200.

Finally, in step S1306, the mail address management unit 1001 notifies the image forming apparatus 140 of the apparatus mail address generated in step S1304 and the option mail address extracted in steps S1302 and S1303, and then ends the processing. Thus, the mail address administration unit 1001 can function as an option mail address notification unit. Notification of the option mail address with a name may be made using the option name 1103 (e.g., "color print<color@print.xxxxx.com>").

FIG. 14 is a flow chart for executing the processing in steps S308 to S313 of FIG. 3 by the server 120 of an exemplary embodiment. First, in step S1401, the mail processing unit 1002 receives a mail transmitted by the mobile 110 in step S308. Thus, the mail processing unit can function as a mail receiving unit.

In step S1402, the mail processing unit 1002 checks whether the mail address described in the destination of the received mail is present in the apparatus mail address management table 1200. If the mail address is not present in the apparatus mail address management table 1200, the mail processing unit 1002 determines that no apparatus mail address is specified (NO in step S1402). Then, in step S1421, the mail processing unit 1002 discards the received mail. Then in step S1422, the mail processing unit 1002 notifies a transmitter who transmitted the mail of an occurrence of error by a mail.

On the other hand, if the apparatus mail address is present in the apparatus mail address management table 1200 (YES in step S1402), then in step S1403, the mail processing unit 1002 extracts the apparatus mail address data of the relevant mail address from the apparatus mail address management table 1200. It is assumed that only one apparatus mail address is set in the destination of the received mail.

In step S1404, the mail processing unit 1002 checks whether the mail address described in the destination of the received mail is present in the option mail address management table 1100. If the mail address is not present in the option mail address management table 1100, the mail processing unit 1002 determines that no option mail address is specified (NO in step S1404). Then, the mail processing unit 1002 skips the step(s) related to the print option and advances the processing to step S1412.

On the other hand, if the mail address is present in the option mail address management table 1100 (YES in step S1404), then in step S1405, the mail processing unit 1002 extracts the option mail address data of the relevant mail address from the option mail address management table 1100. If a plurality of the option mail addresses is specified in the destination of the received mail, the mail processing unit 1002 extracts the option mail address data for all specified option mail addresses.

In step S1406, the mail processing unit 1002 checks whether, among the option mail addresses specified in the destination, a plurality of the option mail addresses in the same group is specified. If the plurality of the option mail addresses in the same group is specified (YES in step S1406), the processing proceeds to step S1407, and otherwise (NO in step S1406), the processing proceeds to step S1408.

In step S1407, because the mail processing unit 1002 can specify only one mail address for each group, from among the specified plural option mail addresses in the same group, the mail processing unit 1002 validates a first specified single mail address as the destination while deleting the others. Thus, the mail processing unit 1002 can function as a group option optimization unit.

In step S1408, the mail processing unit 1002 checks whether the option mail address specified as the destination is in conflict with other option mail addresses, and if there is any option mail address (es) in conflict, the mail processing unit 1002 deletes the conflicted option mail address (es). More specifically, the mail processing unit 102 extracts (recognizes) the option mail address specified as the destination from the first one of the option mail addresses and if the print option described in the conflict list 1106 of the extracted (recognized) option mail address is specified as the destination, the mail processing unit 1002 deletes the option mail address. Thus, the mail processing unit 1002 can function as a conflict resolution unit.

In step S1409, the mail processing unit 1002 sorts the option mail addresses specified as the destination by processing place 1104. Thus, the mail processing unit 1002 can function as an identification unit for identifying which is the option mail address, a print option for processing the option mail address in the server, or a print option for processing the option mail address in the image forming apparatus.

In step S1410, the mail processing unit 1002 checks whether the option mail address, which specifies the image forming apparatus as the processing place, can be processed by the image forming apparatus corresponding to the apparatus mail address specified as the destination, according to the available list 1203. Thus, the mail processing unit 1002 can function as a print capacity check unit.

If there is any option mail address which cannot be processed (NO in step S1410), then in step S1411, the mail processing unit 1002 deletes the option mail address which cannot be processed. Thus, the mail processing unit 1002 can function as a print option deletion unit.

In step S1412, the print processing unit 1003 generates print data for printing a body text of the received mail and image data attached to the received mail. Thus, the print processing unit 1003 can function as a print data generation unit for generating print data. When generating the print data, the print processing unit 1003 generates the print data by applying the print option corresponding to the option mail address whose processing place is the server among the option mail addresses specified as the destination. The print data to which the print option corresponding to the option mail address is applied is data obtained by performing the option processing on the image data by the print processing unit 1003.

In step S1413, when the image forming apparatus 140 designated by the apparatus mail address requests acquisition of print data, the print processing unit 1003 transmits the print option in the form of a print instruction together with the generated print data. The print option to be transmitted in step S1413 is the print option corresponding to the option mail address whose processing place is the image forming apparatus among the option mail addresses specified as the destination. The processing of the print option (option processing) which the image forming apparatus executes is referred to as finishing processing. The print processing unit 1003 can function as an information transmission unit for transmitting information, which causes the image forming apparatus 140 to execute the finishing processing to the image forming apparatus 140.

By using the print option mail address according to the procedure described in the first exemplary embodiment, a user can specify a print option without any special software or any complicated procedure, so that the convenience of the user can be improved.

Next, a second exemplary embodiment is described. In the first exemplary embodiment, when any print option which cannot be processed by the image forming apparatus is specified as the option mail address, print is executed neglecting the relevant print option. According to the second exemplary embodiment, if there is any print option which cannot be processed, the print is not executed but an image forming apparatus capable of processing the print option is searched from among other image forming apparatuses possessed by the same administrator.

Figure 16:
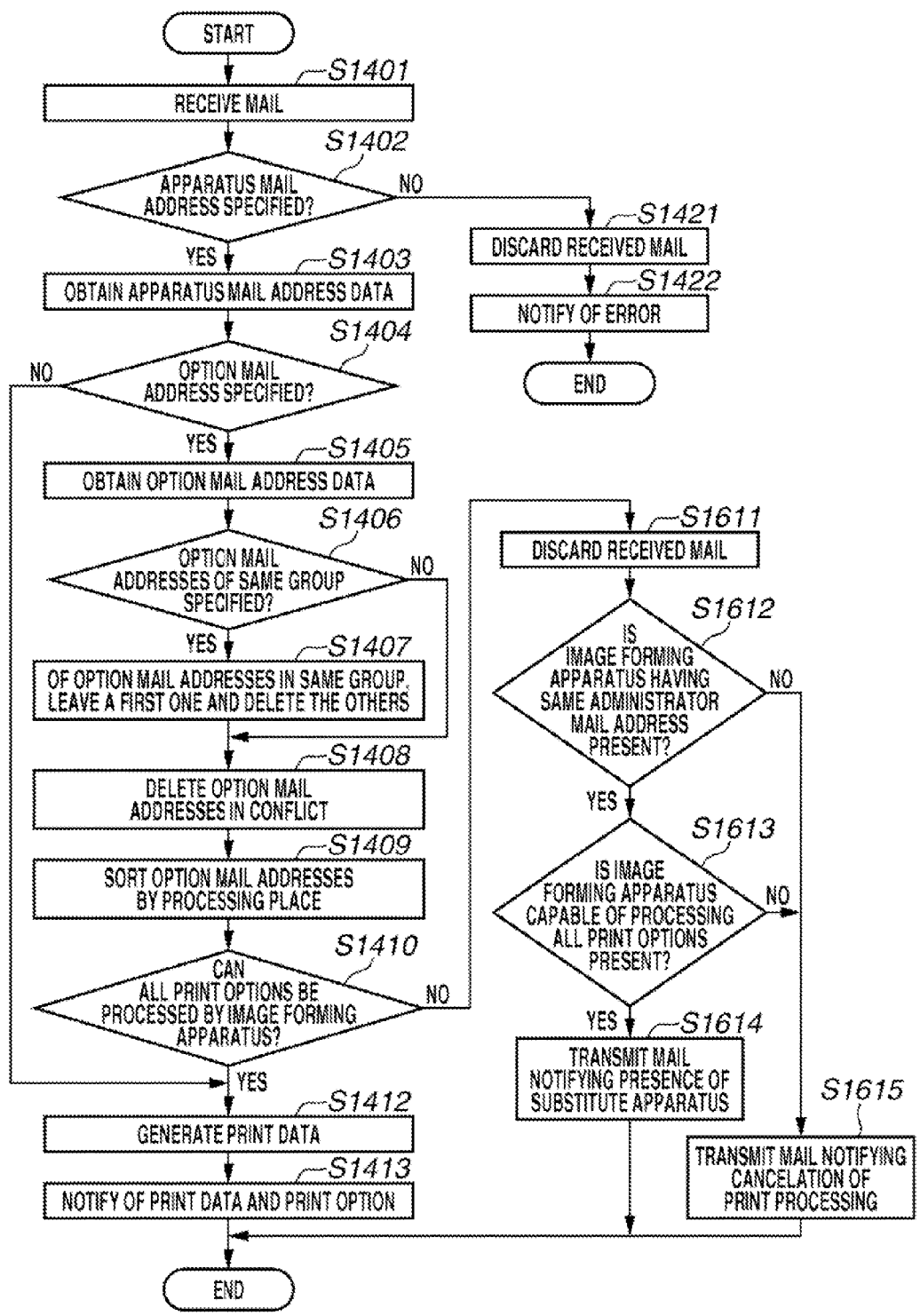
FIG. 16 is a flow chart illustrating an example of processing in a server according to a second exemplary embodiment.

FIG. 16 is a flow chart illustrating expanded processing of the server 120 from that shown in FIG. 14. The flow chart illustrated in FIG. 16 is achieved when the CPU 221 in the control unit 121 reads out a program for executing each processing in the flow chart from the HDD 224 to the RAM 222 and analyzes and executes the read program. Since the processing in steps of FIG. 16 having the same step numbers as in FIG. 14 is similar to that described in the flow chart in FIG. 14, the description thereof is omitted below.

What is different from the processing shown in FIG. 14 is processing when it is determined in step S1410 that there is an option mail address which cannot be processed. In step S1611, the mail processing unit 1002 discards a received mail because the mail processing unit 1002 does not print the received mail in which an option mail address which cannot be processed is specified.

In step S1612, the mail processing unit 1002 retrieves an apparatus mail address having the same administrator mail address as the administrator mail address 1204 of the apparatus mail address specified as the destination, from the apparatus mail address management table 1200. When the mail processing unit 1002 finds out affirmatively that the apparatus mail address having the same administrator mail address is present (YES in step S1612), the processing proceeds to step S1613, and otherwise (NO in step S1612), the processing proceeds to step S1615.

In step S1613, from among the apparatus mail addresses found in step S1612, the mail processing unit 1002 searches to see whether there is any apparatus mail address capable of processing all the print options. Thus, the mail processing unit 1002 can function as an alternate apparatus retrieval unit.

If the mail processing unit 1002 finds an apparatus mail address capable of processing all the print options (YES in step S1613), then in step S1614, the mail processing unit 1002 notifies a transmitter of the received mail of the apparatus mail address of the found apparatus as the alternate apparatus. It is also possible to arrange the processing so that a user can transmit an electronic mail to the alternate apparatus only by sending back to a notification mail by specifying the apparatus mail address of the alternate apparatus at the "From" or "Replay-To" field(s) of the electronic mail header.

On the other hand, if any apparatus mail address capable of processing all the print options is not found (NO in step S1613), then in step S1615, the mail processing unit 1002 notifies the transmitter of the received mail that the print processing is canceled.

According to the procedure described with respect to the second exemplary embodiment, if there is any print option which cannot be processed, time and labor of a user for searching for an image forming apparatus capable of executing the specified print option can be saved by notifying the user of an alternate image forming apparatus, so that the convenience of the user can be improved.

Next, a third exemplary embodiment, of a case where the server 120 receives an electronic mail in which a plurality of the apparatus mail addresses is specified will be described. According to this exemplary embodiment, when receiving an electronic mail in which a plurality of the apparatus mail addresses is specified, the server 120 can select an apparatus mail address having most print options which can be processed as an apparatus for executing printing.

Figure 17:
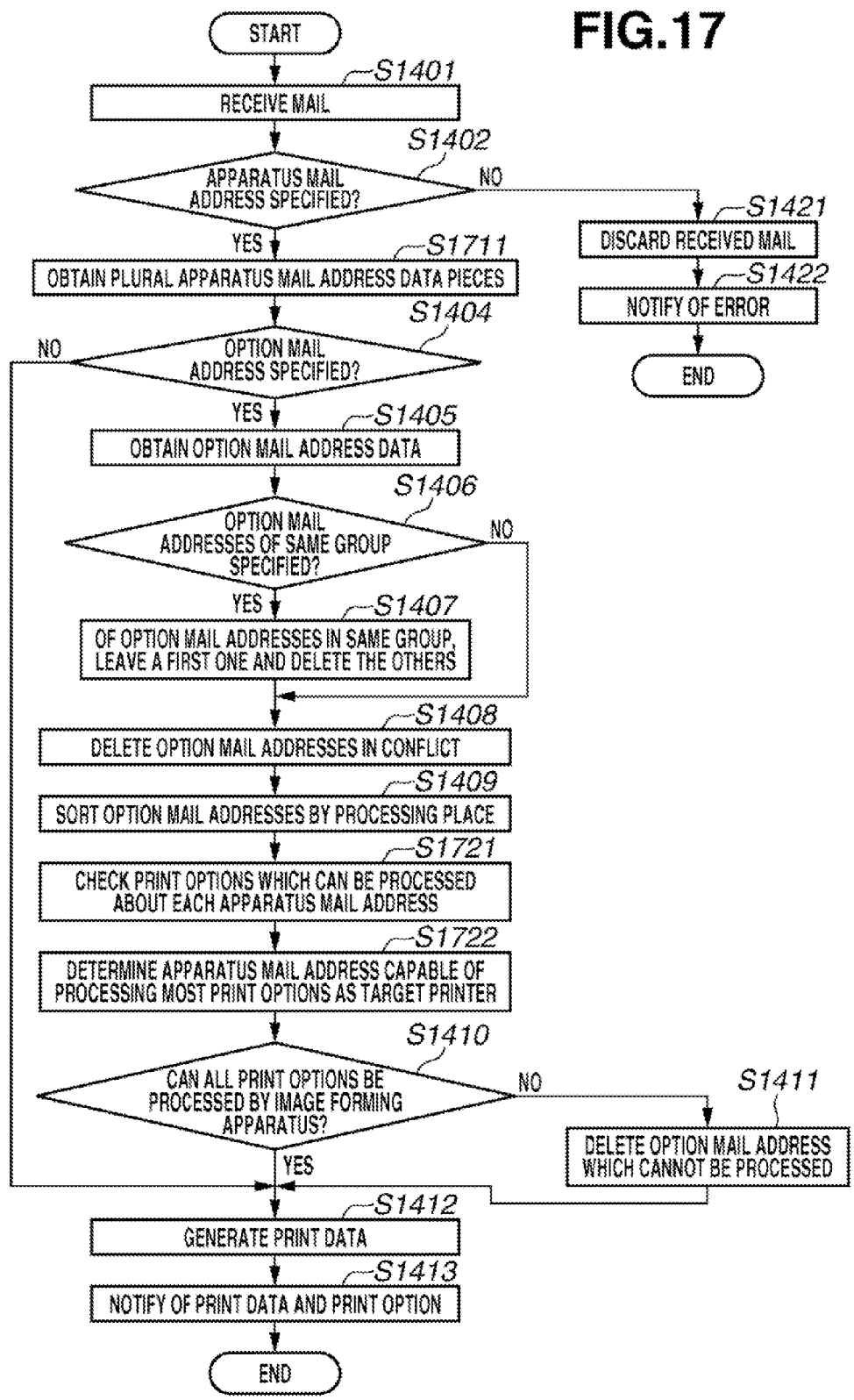
FIG. 17 is a flow chart illustrating an example of processing in a server according to a third exemplary embodiment.

FIG. 17 is a flow chart illustrating expanded processing of the server 120 from that shown in FIG. 14. The flow chart illustrated in FIG. 17 is achieved when the CPU 221 in the control unit 121 reads out a program for executing each processing in the flow chart from the HDD 224 to the RAM 222 and analyzes and executes the read program. Since the processing in steps of FIG. 17 having the same step numbers as in FIG. 14 is similar to that described in the flow chart in FIG. 14, the description thereof is omitted.

What is different in FIG. 17 from the processing in FIG. 14 is processing in step S1711 instead of step S1403 and processing in steps S1721 and S1722 in a period between step S1409 and step S1410.

In step S1711, the mail processing unit 1002 extracts the apparatus mail address data from the apparatus mail address management table 1200 with respect to all the apparatus mail addresses specified as the destination of the received mail.

In step S1721, the mail processing unit 1002 checks, for each of a plurality of the apparatus mail addresses specified as the destination, about how many print options whose processing place is the image forming apparatus can be processed in the option mail addresses specified as the destination. Thus, the mail processing unit 1002 can function as a plural-apparatus checking unit.

Based on a result of the check, the mail processing unit 1002 determines an apparatus mail address capable of processing most option mail addresses specified as the destination, as a target printing apparatus. In step S1722, if there is a plurality of the apparatus mail addresses capable of processing the same number of the option mail addresses, the mail processing unit 1002 determines an apparatus mail address specified first as the destination of the electronic mail, as the target printing apparatus. Thus, the mail processing unit 1002 can function as a transmission target determination unit.

According to the procedure described in the third exemplary embodiment, when an electronic mail in which a plurality of apparatus mail addresses is specified is received, the printing can be executed by a printing apparatus capable of processing most print options specified by a user, so that the convenience of the user can be improved.

In the above-described exemplary embodiments, the mobile 110 obtains the mail address by reading the QR code displayed on the image forming apparatus 140 through the processing flow in steps S301 to S306. However, this is not the only permissible configuration. In other words, the subject matter of the instant application can be applied to a method other than one in which a user displays the QR code on the operation unit 143 of the image forming apparatus 140 and reads the QR code by the camera unit 117 of the mobile 110.

For example, when a user requests the server 120 to issue the mail address via the operation unit 143, the user notifies the server 120 of the mail address of the mobile 110 which the user wants to register as the mail address (i.e., the apparatus mail address and option mail address). The mail address of the mobile 110 to be notified to the server 120 may be specified by the user selecting from the mail addresses registered preliminarily in the image forming apparatus 140 or newly and directly entered by the user via the operation unit 143.

When receiving a mail address (the apparatus mail address and option mail address) issuance request together with the mail address of the mobile 110, the server 120 converts information about the mail address (the apparatus mail address and option mail address) into a registration form for the address book of the mobile 110. Then, the server 120 transmits a mail, to which the mail address information converted into the registration form for the address book is attached, to the mail address of the mobile 110.

When receiving the mail, the mobile 110 registers the mail address information converted into the registration form for the address book attached to the mail, into the address book. In the registration into the address book, the server 120 may generate mail address information which enables a name of the image forming apparatus 140 to be registered in the name column of the address book. The mail address information may be any type of information described in a body text of a mail which the mobile 110 receives, and is not limited to the information converted into the registration form for the address book. In the above-described procedure, the mobile 110 may acquire and register the mail address (the apparatus mail address and option mail address).

The option mail address may be substituted by other information as long as the other information is information corresponding to the option processing. When the mobile 110 transmits a mail to an apparatus mail address, the other information only has to be described in a form which allows the server 120 to identify information corresponding to the option processing.

The subject matter of the instant application is not limited to the above-described exemplary embodiments. The hardware circuit configuration achieved in each exemplary embodiment can be configured as software (for example, a computer program) for achieving the functions of the hardware configuration, and the subject matter of the instant application can be realized by the CPU executing the computer program. Such a computer program can be supplied to a system or an apparatus via a network or various types of storage media and a computer (or a CPU, a micro processing unit (MPU), etc.) of the system or the apparatus reads out and executes the computer program.

Conversely, achieving functions which are achieved by software using a hardware circuit is within the scope of the instant application.

Aspects of the instant application can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the subject matter of the instant application has been described with reference to exemplary embodiments, it is to be understood that the subject matter herein is not limited to the disclosed exemplary embodiments. The scope of the following claims is to be accorded the broadest interpretation so as to encompass all modifications, equivalent structures, and functions.

This application claims priority from Japanese Patent Application No. 2011-142993 filed Jun. 28, 2011, which is hereby incorporated by reference in its entirety.

What is claimed is:

1. An information processing apparatus comprising:
a registration unit configured to register a first email address corresponding to a printing apparatus which prints an image and a second email address corresponding to option processing to be performed on the image into an address book;
a setting unit configured to set the first email address and the second email address as transmission destinations of an email in response to a user selecting the first email address and the second email address among addresses registered in the address book; and a transmission unit configured to transmit the email whose transmission destinations are set by the setting unit, the image to be printed by the printing apparatus attached to the email, wherein the option processing corresponding to the second email address set as the transmission destination is performed on the image attached to the transmitted email.

2. The information processing apparatus according to claim 1, wherein the registration unit registers each of the first and second email addresses into the address book by reading a two-dimensional bar code in which the first and second email addresses are stored, based on a user instruction.

3. The information processing apparatus according to claim 1, wherein the information processing apparatus is a mobile terminal.

4. The information processing apparatus according to claim 1, wherein a domain name part of the first email address and a domain name part of the second email address are the same.

5. A method for information processing to be executed by an information processing apparatus including an address book, the method comprising:
registering a first email address corresponding to a printing apparatus which prints an image and a second email address corresponding to option processing to be performed on the image into the address book;
setting the first email address and the second email address as transmission destinations of an email in response to a user selecting the first email address and the second email address among addresses registered in the address book; and
transmitting the email whose transmission destinations are set, the image to be printed by the printing apparatus attached to the email,
wherein the option processing corresponding to the second email address set as the transmission destination is performed on the image attached to the transmitted email.

6. An image processing system comprising:
a reception unit configured to receive, from an information processing apparatus, an email to which an image has been attached, wherein an apparatus email address corresponding to a printing apparatus which prints the image and an option email address corresponding to option processing to be performed on the image are set as destinations of the email, and the apparatus email address and the option email address have been selected from an address book of the information processing apparatus;
a determining unit configured to determine whether the option email address is set as the destination of the received email;
a processing unit configured to perform the option processing corresponding to the option email address set as the destination of the received email on the image in a case where it is determined that the option email address is set as the destination of the received email; and
a transmission unit configured to transmit the image on which the option processing has been performed to the printing apparatus corresponding to the apparatus email address set as the destination of the received email.

7. The image processing system according to claim 6, wherein the determining unit further determines whether or not a plurality of the option email addresses are set as the destinations of the received email and whether or not option processings, each corresponding to a different one of the plurality of the option email addresses, conflict with each other, and
wherein the processing unit resolves the conflict between the option processings by refraining from executing one of the option processings in conflict with each other on the image in a case where the determining unit determines that the plurality of the option email addresses are set as the destinations of the received email and the option processing corresponding to each of the plurality of the option email addresses conflicts with each other.

8. The image processing system according to claim 7, wherein the processing unit includes a unit configured to select a first option email address from the plurality of the option email addresses and to determine whether a second option email address corresponding to the option processing in conflict with the option processing corresponding to the selected first option email address is included in the plurality of the option email addresses, and
wherein the processing unit resolves the conflict between the option processings by deleting the second option email address from the plurality of the option email addresses based on a result of the determination.

9. The image processing system according to claim 6, further comprising a management unit configured to manage the option email address corresponding to option processing which can be processed by the printing apparatus and the apparatus email address by associating with each other, when an issuance request of the apparatus email address is received from the printing apparatus.

10. The image processing system according to claim 6, wherein, if the option processing corresponding to the option email address includes finishing processing to be executed in the printing apparatus,
the processing unit specifies the finishing processing included in the option processing and perform the option processing other than the finishing processing on the image; and
the transmission unit transmits, to a printing apparatus corresponding to the apparatus email address, the image on which the option processing other than the finishing processing has been performed and information for causing the printing apparatus to execute the specified finishing processing to a printing apparatus corresponding to the apparatus email address.

11. The image processing system according to claim 6, wherein a domain part of the apparatus email address and a domain part of the option email address are the same.

* * * * *